United States Patent

Doehring et al.

[15] 3,680,407

[45] Aug. 1, 1972

[54] VIBRATION DAMPENER FOR MOTOR VEHICLE DRIVE SHAFT

[72] Inventors: Ekkehard Doehring; Peter Kirschner, both of Wolfsburg, Germany

[73] Assignee: Volkswagenwerk Akt., Wolfsburg, Germany

[22] Filed: May 10, 1971

[21] Appl. No.: 141,503

Related U.S. Application Data

[63] Continuation of Ser. No. 837,151, June 27, 1969, abandoned.

[30] Foreign Application Priority Data

July 2, 1968 Germany .............P 17 55 860.0

[52] U.S. Cl. ........................74/574, 64/1 V, 188/1 B

[51] Int. Cl. ..........................................F16f 15/02

[58] Field of Search.........74/574; 64/1 V, 13, 15, 21; 308/26, 184 R; 188/1 B

[56] References Cited

UNITED STATES PATENTS

| | | | |
|---|---|---|---|
| 3,037,573 | 6/1962 | Larsen | 308/184 R X |
| 2,857,974 | 10/1958 | Heller | 308/184 R X |
| 1,958,982 | 5/1934 | Wintercorn | 64/1 V X |
| 2,092,291 | 9/1937 | Olsen | 308/184 R |
| 3,292,389 | 12/1966 | Adloff et al. | 64/1 V |

*Primary Examiner*—William F. O'Dea
*Assistant Examiner*—F. D. Shoemaker
*Attorney*—Watson, Cole, Grindle & Watson

[57] ABSTRACT

Vibrations are dampened in a normally straight drive shaft for automobiles through the use of a plurality of cylindrical vibration dampening masses disposed at locations on the shaft corresponding to the nodal points of the smallest harmonic of the natural bending frequency of the shaft occurring at a rotational speed greater than the maximum normal operating speed of the shaft.

10 Claims, 5 Drawing Figures

INVENTOR:
EINAR T. YOUNG
D. A. Rechif
ATTY.

INVENTOR:
EINAR T. YOUNG

ATTY.

INVENTOR:
EINAR T. YOUNG
ATTY.

VIBRATION DAMPENER FOR MOTOR VEHICLE DRIVE SHAFT

CROSS-REFERENCES TO RELATED APPLICATIONS

This application is a continuation of copending application Ser. No. 837,151, filed June 27, 1969, now abandoned. Applicants claim priority from corresponding German patent application Ser. No. P 17 55 860.0, filed July 2, 1968.

BACKGROUND OF THE INVENTION

1. Field of the Invention

This invention relates to a vibration dampening system for a straight automotive drive shaft. In particular, the dampener system is utilized with a straight drive shaft which comprises a thin metal rod extending from a front mounted engine to the rear driven wheels of the vehicle.

2. Description of the Prior Art

A well known prior art method for preventing vibration in drive shafts is to construct them of such rigid materials that the natural first mode bending frequency of the shaft occurs at a rotational speed which is greater than the normal maximum operating speed of rotation thereof and the shaft therefore remains subcritical. Such rigid shafts are bulky and expensive. Thus, it is desirable to utilize drive shafts comprising thin metal rods having a natural bending frequency which occurs at a rotational speed below the normal operating range of the shaft. Such a shaft construction is desirable because the shaft has a small moment of inertia and torsional softness thereby facilitating good dampening of coupling shocks and the like. However, vibrations of higher order harmonics of the natural bending frequency, for example the second and third harmonics, cause considerable difficulties in this type structure and therefore such shafts have in the past been generally encased in a pipe and guided therein by a plurality of intermediate bearings in order to achieve subcritical operation. Necessarily, such guide pipes must be rigid to remain subcritical and prevent vibrations and resultant noise.

Another prior art construction featuring a thin metal shaft involves bending of the shaft and rotation thereof in a bent state. The first mode bending frequency of a shaft is increased as a result of these measures. However, it is not possible, in the case of drive shafts of a practical constructional length for motor vehicles, to raise the first mode bending frequency of the shaft to a value such that it occurs at a rotational speed above the normal operational speed of the shaft. Therefore, the first mode bending frequency will occur within the operational range. Further, harmonics of the first mode bending frequency will be only slightly influenced by the flexure so that harmonics of low order, such as the second harmonic, will likewise generally occur within the working range. Since operation at the first mode bending frequency and its harmonics will lead to circularly polarized vibrations caused by slight unavoidable stimulations, this solution is not practical.

SUMMARY OF THE INVENTION

It is, therefore, an object of the invention to provide structure to dampen, by simple measures, vibrations in a shaft caused by the fact that harmonics of the first mode natural bending frequency of the shaft occur at a rotational speed within the normal working range of the shaft.

According to the invention, vibration dampeners are connected with the shaft for dampening harmonics which occur at a rotational speed in the working range. A vibration dampener constructed in accordance with the invention comprises structure capable of vibrating consisting of a spring-mass system tuned to harmonics of the first mode natural bending frequency of the shaft.

The invention is utilized advantageously in connection with a motor vehicle having a front mounted engine and rear mounted transmission and differential gearing. The normal rotational speed range of the drive shaft therefore corresponds to the rotational speed range of the engine and not to the rotational speed range of the wheels. Generally, only the second and third harmonics of the first mode natural bending frequency of the drive shaft will occur at a rotational speed within the working range of the shaft. Preferably, therefore, three vibration dampeners will be placed at locations on the shaft corresponding to the three nodal points of fourth harmonic vibrations.

The vibration dampeners should have no sharply defined natural vibrational frequency of their own, but they should be capable of acting over a more or less broad frequency range, a situation which can be achieved by utilizing dampeners having several differing frequencies (or spring constants). The differing frequencies of a dampener can also be assigned to different harmonics that are to be dampened.

The dampeners may preferably be isolated torsionally from the shaft by interposition of a bearing, preferably an antifriction bearing such as a roller bearing. The directions or planes of vibrations of the dampeners may be varied, by a relative twisting of the dampeners of the same structure.

The optimum disposition of the dampeners must ultimately be determined by trial and error and for that reason, only the base principle of a vibration dampener system constructed in accordance with the present invention will be explained in the following description of a preferred embodiment of the invention.

DESCRIPTION OF THE PREFERRED EMBODIMENTS

Figure 1:
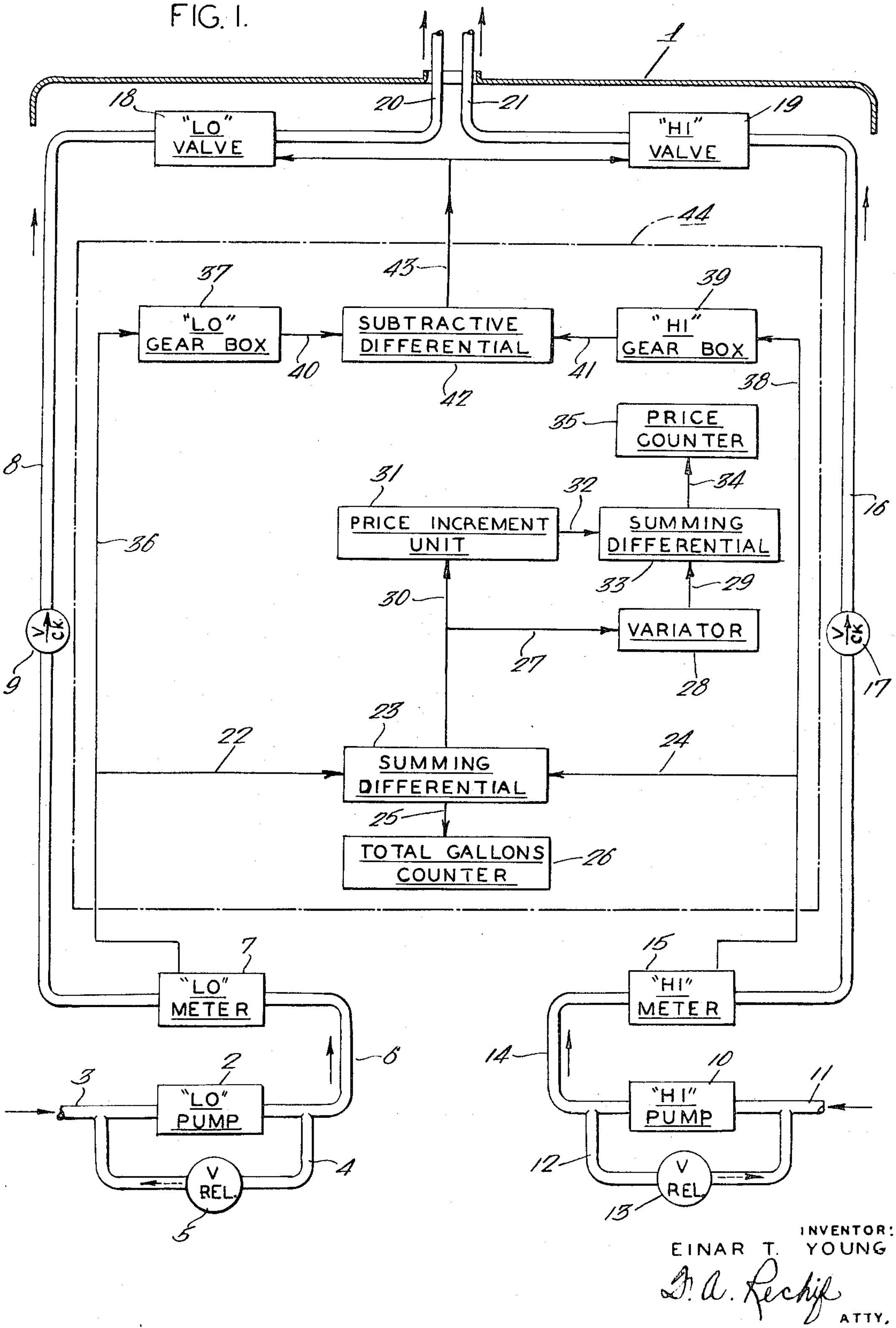
FIG. 1 is a diagrammatic view showing a drive shaft of the type contemplated by the present invention along with a representation of its forms of vibrations.

The vibrations of a thin freely revolving normally straight shaft 1 show the vibration image represented in FIG. 1, in which the number of antinodes or loops of vibrations correspond to the harmonic order of the vibration. The speed of rotation at which resonance occurs is obtained by multiplying the rotational speed where first mode vibrations occur with the square of the harmonic. Vibrations are controlled by attaching vibration dampers 2, 3 and 4 to the shaft at locations on the latter which correspond to the nodes of the smallest harmonic which occurs at a rotational speed above the normal working range of the shaft (for example the fourth harmonic). The increase of the mass resulting from the attachment of dampers 2, 3 and 4 will not naturally alter the frequency of the fourth harmonic since the additional masses are located in the nodes of fourth harmonic vibrations. On the other hand, the additional mass will cause the frequencies of all lower harmonics, for example the first to third harmonics, to be decreased. The first mode harmonic generally will be considerably below the working range, that is, below the idling speed of the engine. The operation of the engine therefore occurs supercritically with respect to first harmonic vibrations.

With regard to the second harmonic, the two outside vibration dampers 2 and 4 are disposed in the range of the antinodes of second harmonic vibrations and these dampers 2 and 4 are mounted in such a manner that the second harmonic vibrations of the shaft, as influenced by the additional mass of the dampers, are within a natural frequency range of the dampers 2 and 4. A second natural frequency of the dampers 2 and 4 may be near to the third harmonic.

In connection with the third harmonic, the middle damper 3 is disposed at the middle antinode of vibration. The two outside dampers 2 and 4 are disposed in the region of the outside antinodes of vibration. Thus, the damper system responds to both of the harmonics (second and third) which occur within the normal working rotational speed range of the shaft. In this manner, particularly dangerous vibrations are controlled and the shaft is maintained generally at rest even at rotational speeds which coincide with harmonic vibration frequencies.

Figure 2:
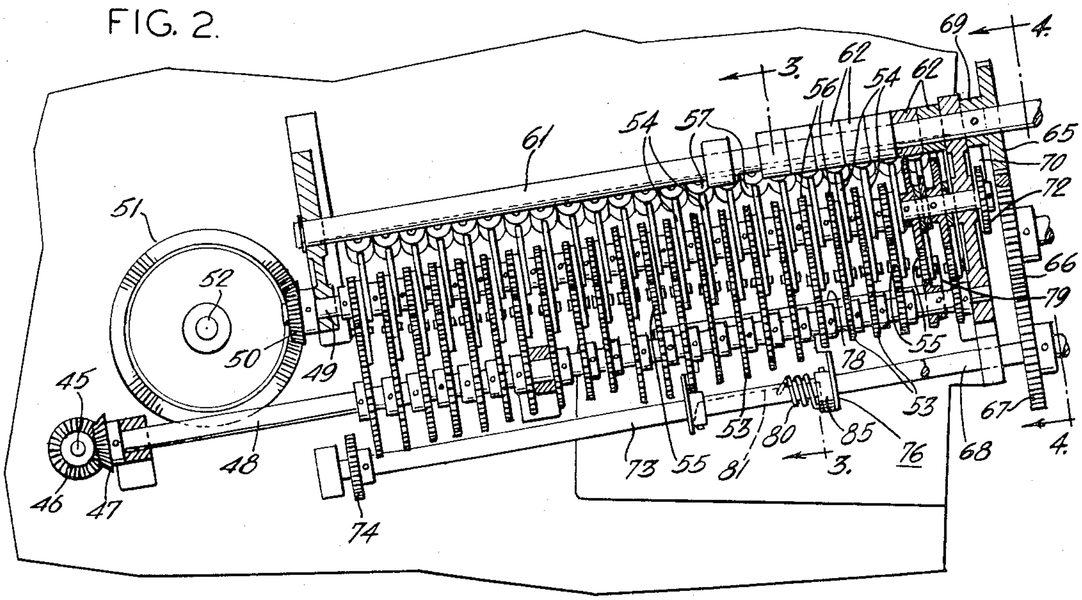
FIG. 2 is a perspective view of the shaft.

FIG. 2 illustrates two dampers, each of which has two vibration directions running radially in relation to the normal axis of the shaft, may be relatively twisted or offset circumferentially of the shaft whereby the same are displaced against each other in order to better counter the rotational vibrations of the shaft. The frequencies $\omega_1$ correspond approximately to the second harmonic and the frequencies $\omega_2$ correspond approximately to the third harmonic.

Figure 3:
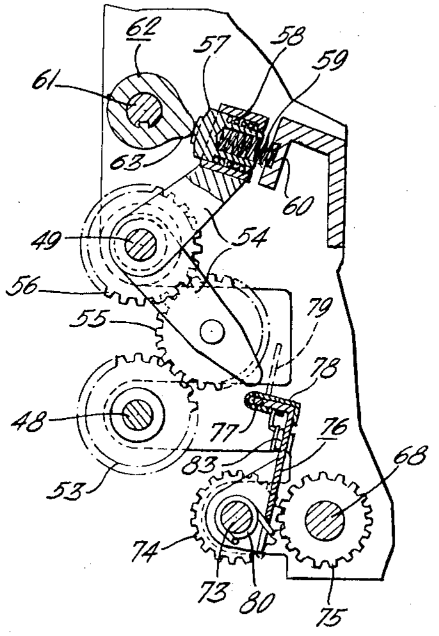
FIG. 3 is a cross-sectional elevational view of a drive shaft and a vibration dampener system which embodies the invention.

In FIG. 3, a vibration damper is shown as including an anti-friction bearing 6 keyed to shaft 1 by means of a number of screws 5. The outside bearing ring of bearing 6 carries a pipe-shaped rubber spring 7, which in turn is connected at its free end with a metal ring 8 spaced radially from shaft 1. A sheet iron cover 9 serves to secure the connection between the anti-friction bearing 6 and the rubber spring 7 and to facilitate the torsional isolation of the vibration system from the shaft. In connection with the latter, cover 9 is provided with holes 15a which are connected by rubber bushes 10 to corresponding holes 16 in the vehicle body 11 which receive the torsion forces of the bearing.

Effectively, the damper may be produced in several parts (not shown) to facilitate assembly and disassembly of the damper while the shaft is assembled.

Figure 4:
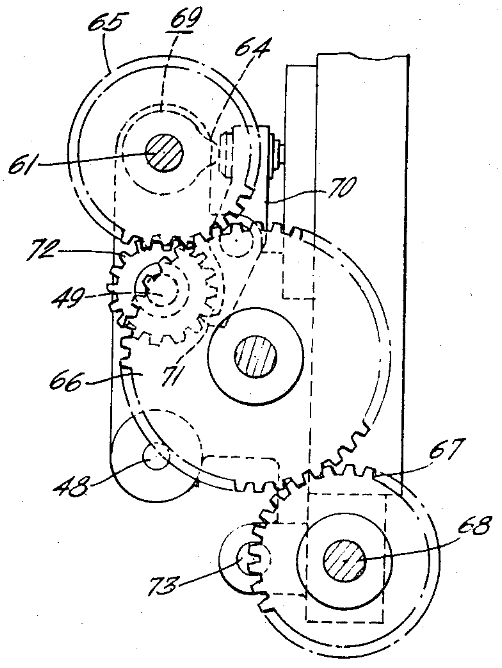
FIG. 4 is a diagrammatic view of a shaft according to the invention with pipelike dampeners connected thereto.
Figure 5:
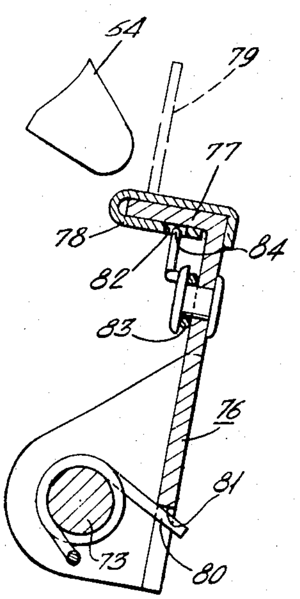
FIG. 5 is an enlarged sectional view of a portion of FIG. 4.
Figure 6:
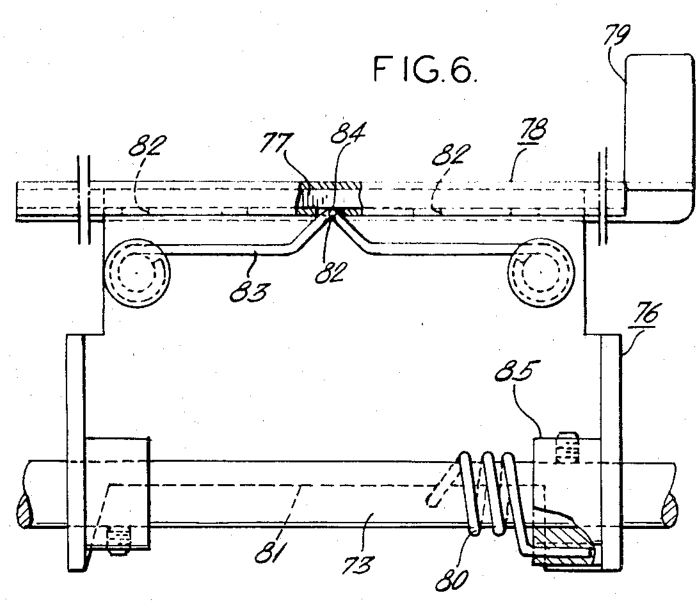
Figure 7:
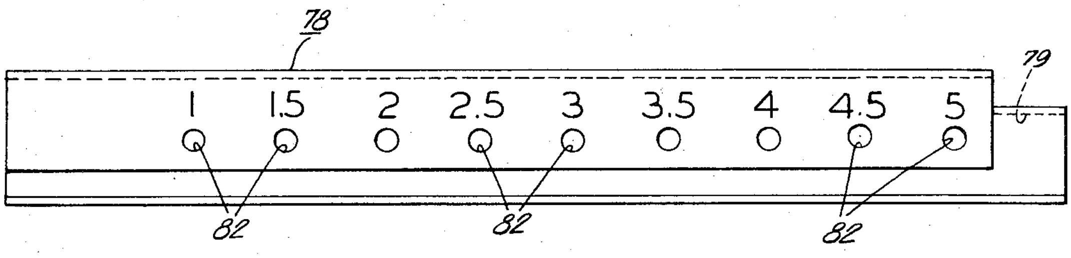
Figures 1, 2, 3:
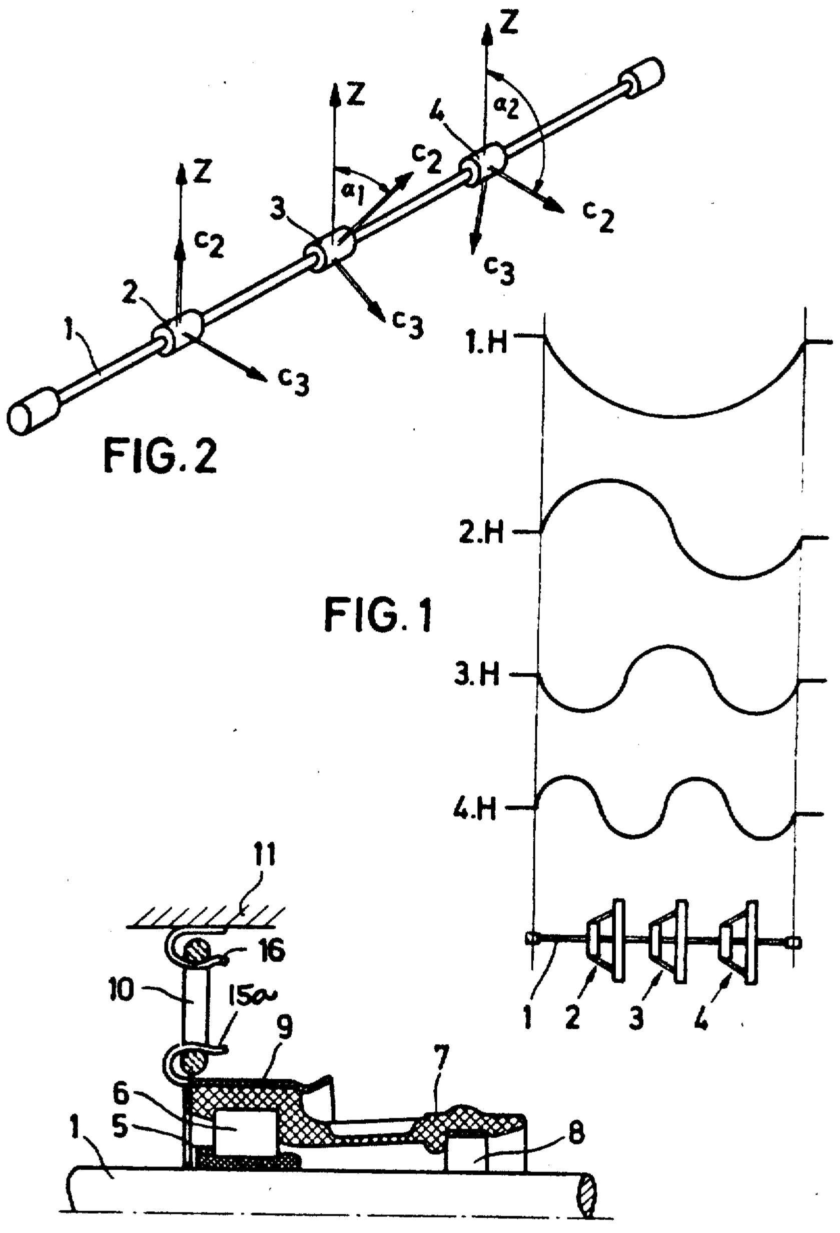
Figure 4:
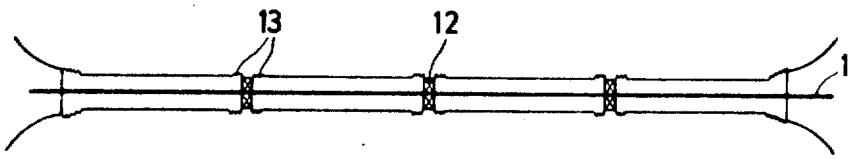
Figure 5:
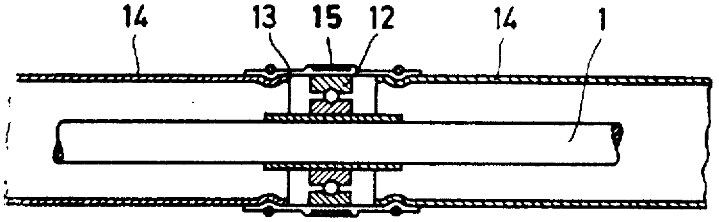

Another embodiment of the invention is illustrated in FIGS. 4 and 5. In order to protect the damper and the bearings from fouling, especially in the case of a drive tube open in a downward direction, the damper masses as shown in FIGS. 4 and 5 can be provided as plastic or metal pipe sections 14. The masses 14 may be mounted between the bearings 12 on pipe-shaped rubber springs 13. The latter are connected to adjacent masses 14 and may be covered with an additional mass 15 facing 12 so that they can not be soiled.

In this embodiment it is not necessary that each damper be provided with individual means to prevent torques introduced in the central units may be prevented merely by securing the end units against torque through the use of flexible elements attached between the vehicle and the end units. The central units are attached to the end units by the rubber springs 13.

We claim:

1. Structure for damping vibrations in a drive shaft for motor vehicles comprising an elongated, normally straight rod having a first mode natural bending frequency which occurs at a rotational speed less than the normal minimum rotational speed of the shaft, said structure comprising a plurality of damper devices connected to said shaft, each of said devices including a cylindrical mass surrounding the shaft, said masses being disposed for damping harmonics of said first mode natural bending frequency, adjacent masses being interconnected by cylindrical rubber springs extending therebetween, there being provided anti-friction devices mounting the springs on the shaft for rotation of the latter relative to the springs.

2. Structure as set forth in claim 1 wherein said masses are disposed at locations along the shaft corresponding to the nodes of the smallest harmonic of said natural frequency which occurs at a rotational speed greater than the maximum rotational speed of the shaft.

3. Structure as set forth in claim 2 wherein said masses are disposed at locations corresponding to the three nodes of the fourth harmonic of said natural frequency.

4. Structure as set forth in claim 1 wherein the directions of vibration of the dampers are relatively offset circumferentially of the shaft.

5. Structure as set forth in claim 1 wherein the masses disposed at the ends of the shaft are secured to the vehicle to prevent rotation thereof.

6. Structure for damping vibrations in a drive shaft for motor vehicles comprising an elongated, normally straight rod having a first mode natural bending frequency which occurs at a rotational speed less than the normal minimum rotational speed of the shaft, said structure comprising a plurality of damper devices connected to said shaft, each of said devices including a cylindrical mass surrounding the shaft, said masses being disposed for damping harmonics of said first mode natural bending frequency, there being an anti-friction device provided between each mass and the shaft whereby the latter is rotatable relative to the masses, said masses being supported against rotation by resilient flexible means attached between the masses and the vehicle itself, said resilient flexible means comprising a rubber cylinder extending axially of the shaft in surrounding relationship thereto.

7. Structure for dampening vibrations in a drive shaft for motor vehicles comprising an elongated, normally straight rod having a first mode natural bending frequency which occurs at a rotational speed less than the normal minimum rotational speed of the shaft, said structure comprising a plurality of dampener devices connected to said shaft, each of said devices including a cylindrical mass surrounding the shaft, said masses being disposed for dampening harmonics of said first mode natural bending frequency, there being an antifriction device provided between each mass and the shaft whereby the latter is rotatable relatively to the masses, said masses being supported against rotation by resilient flexible means attached between the masses and the vehicle itself, said resilient flexible means comprising a rubber band, there being a hook attached to the mass and a stationary hook on the vehicle, said band being looped around the hooks.

8. Structure as set forth in claim 7 wherein said masses are disposed at locations along the shaft corresponding to the nodes of the smallest harmonic of said natural frequency which occurs at rotational speed greater than the maximum rotational speed of the shaft.

9. Structure as set forth in claim 8 wherein said masses are disposed at locations corresponding to the three nodes of the fourth harmonic of said natural frequency.

10. Structure as set forth in claim 7, wherein the directions of vibration of the dampeners are relatively offset circumferentially of the shaft.

* * * * *

UNITED STATES PATENT OFFICE
CERTIFICATE OF CORRECTION

Patent No. 3,680,407 Dated August 1, 1972

Inventor(s) Doehring Ekkehard, et. al.

It is certified that error appears in the above-identified patent and that said Letters Patent are hereby corrected as shown below:

Cancel the 3 sheets of drawing and substitute the attached sheets in their place. Cancel the figure illustrated on the front page format and substitute Fig. 1 of the attached drawings.

Signed and sealed this 26th day of December 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
U.S. GOVERNMENT PRINTING OFFICE : 1969 O—366-334.

INVENTORS
E. Dohring
BY P. Kirschner
Watson, Cole, Grindle & Watson
Attys.

SHEET 2 OF 2

INVENTORS
E. Dohring
BY P. Kirschner
Watson Cole Grindle & Watson
Attys.